United States Patent
Aihara et al.

(10) Patent No.: US 10,758,008 B2
(45) Date of Patent: *Sep. 1, 2020

(54) CORD LOCK

(71) Applicant: NIKE, Inc., Beaverton, OR (US)

(72) Inventors: Yuki Aihara, Portland, OR (US); Kevin C. Sze, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/263,718

(22) Filed: Jan. 31, 2019

(65) Prior Publication Data
US 2019/0159552 A1 May 30, 2019

Related U.S. Application Data

(63) Continuation of application No. 15/239,284, filed on Aug. 17, 2016, now Pat. No. 10,226,104.
(Continued)

(51) Int. Cl.
*A43C 7/00* (2006.01)
*F16G 11/10* (2006.01)
(Continued)

(52) U.S. Cl.
CPC ............ *A43C 7/00* (2013.01); *A41F 1/002* (2013.01); *A41F 9/025* (2013.01); *A43C 7/005* (2013.01);
(Continued)

(58) Field of Classification Search
CPC .. A43C 7/00; A43C 7/08; A43C 7/005; F16G 11/101; A41F 1/002; A41F 9/025; A45C 13/1069; A45C 13/1046
See application file for complete search history.

(56) References Cited

U.S. PATENT DOCUMENTS 4,453,292 A 6/1984 Bakker
4,622,726 A 11/1986 Nakamura
(Continued)

FOREIGN PATENT DOCUMENTS

CN 201965361 U 9/2011
CN 204317672 U 5/2015
(Continued)

OTHER PUBLICATIONS

"Original feelux cord lock type magnetic the disassemblability magnetic ring 10mm wire." AliExpress, aliexpress.com, Seller: Shenzhen Bingo Trade Co., Ltd. http://www.aliexpress.com/item/Original-feelux-cord-lock-type-magnetic-the-disassemblability-magnetic-ring-10mm-wire/1023783788.html.
(Continued)

*Primary Examiner* — Robert Sandy
*Assistant Examiner* — Louis A Mercado
(74) *Attorney, Agent, or Firm* — Shook, Hardy & Bacon L.L.P.

(57) ABSTRACT

A cord lock includes various components used to slidably adjust a cord length, such as one or more housing components that releasably clamp around the cord. In one aspect, the cord lock includes an arrangement of magnets that bias the cord-lock housing components away from one another, in order to secure the cord between the housing components. The housing components can be pressed towards one another to slidably adjust the cord. In a further aspect, the cord lock may also include a magnetized excess-cord retainer that attaches to a portion of the cord and that releasably attaches to the cord lock in order to help gather excess cord pulled through the cord lock.

16 Claims, 13 Drawing Sheets

Related U.S. Application Data

(60) Provisional application No. 62/207,153, filed on Aug. 19, 2015.

(51) Int. Cl.
*A43C 7/08* (2006.01)
*A41F 1/00* (2006.01)
*A45C 13/10* (2006.01)
*A41F 9/02* (2006.01)

(52) U.S. Cl.
CPC ............ *A43C 7/08* (2013.01); *A45C 13/1046* (2013.01); *A45C 13/1069* (2013.01); *F16G 11/101* (2013.01)

(56) References Cited

U.S. PATENT DOCUMENTS

| | | |
|---|---|---|
| 4,964,419 A | 10/1990 | Karriker |
| 4,967,454 A | 11/1990 | Elieff |
| 5,367,891 A | 11/1994 | Furuyama |
| 5,485,733 A | 1/1996 | Hoffman |
| 5,572,773 A | 11/1996 | Bauer |
| 5,722,266 A | 3/1998 | Yeager et al. |
| 6,453,525 B1 | 9/2002 | Liu |
| 6,571,437 B2 | 6/2003 | Liu |
| 6,640,398 B2 | 11/2003 | Hoffman |
| 6,833,507 B2 | 12/2004 | Arkin et al. |
| 6,836,899 B1 | 1/2005 | Glasmire |
| 7,162,978 B2 | 1/2007 | Debien |
| 7,234,739 B2 | 6/2007 | Saitoh et al. |
| 7,640,639 B2 | 1/2010 | de Bien |
| 7,735,336 B2 | 6/2010 | Williams |
| 8,474,108 B2 | 7/2013 | Eisenberger |
| 8,752,252 B2 | 6/2014 | Ninomiya et al. |
| 8,910,353 B2 | 12/2014 | Polegato Moretti |
| 2003/0188464 A1 | 10/2003 | Doria |
| 2005/0198788 A1 | 9/2005 | Costa |
| 2006/0288557 A1 | 12/2006 | Crumrine et al. |
| 2008/0047111 A1 | 2/2008 | Garber |
| 2010/0038199 A1 | 2/2010 | Wengreen |
| 2010/0083699 A1 | 4/2010 | Conigliaro |
| 2012/0042498 A1 | 2/2012 | Chu |
| 2012/0066872 A1 | 3/2012 | Eisenberger |
| 2012/0216373 A1 | 8/2012 | Fiedler |
| 2012/0227220 A1 | 9/2012 | Fiedler |

FOREIGN PATENT DOCUMENTS

| | | |
|---|---|---|
| DE | 10150339 C1 | 8/2002 |
| GB | 2066891 A | 7/1981 |

OTHER PUBLICATIONS

Brickman, Dennis B. "On the Safety of Name Badge Lanyards." ASME 2005 International Mechanical Engineering Congress and Exposition. American Society of Mechanical Engineers, 2005. http://proceedings.asmedigitalcollection.asme.org/proceeding.aspx?articleid=1583414.

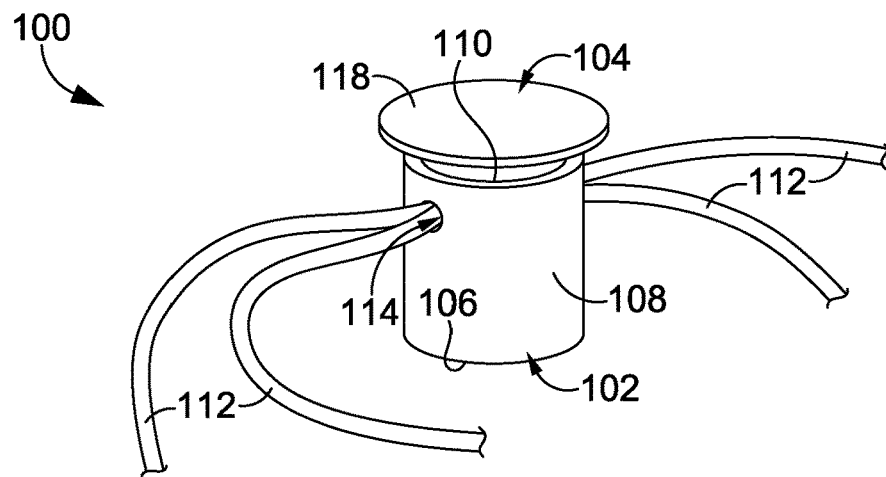
FIG. 1
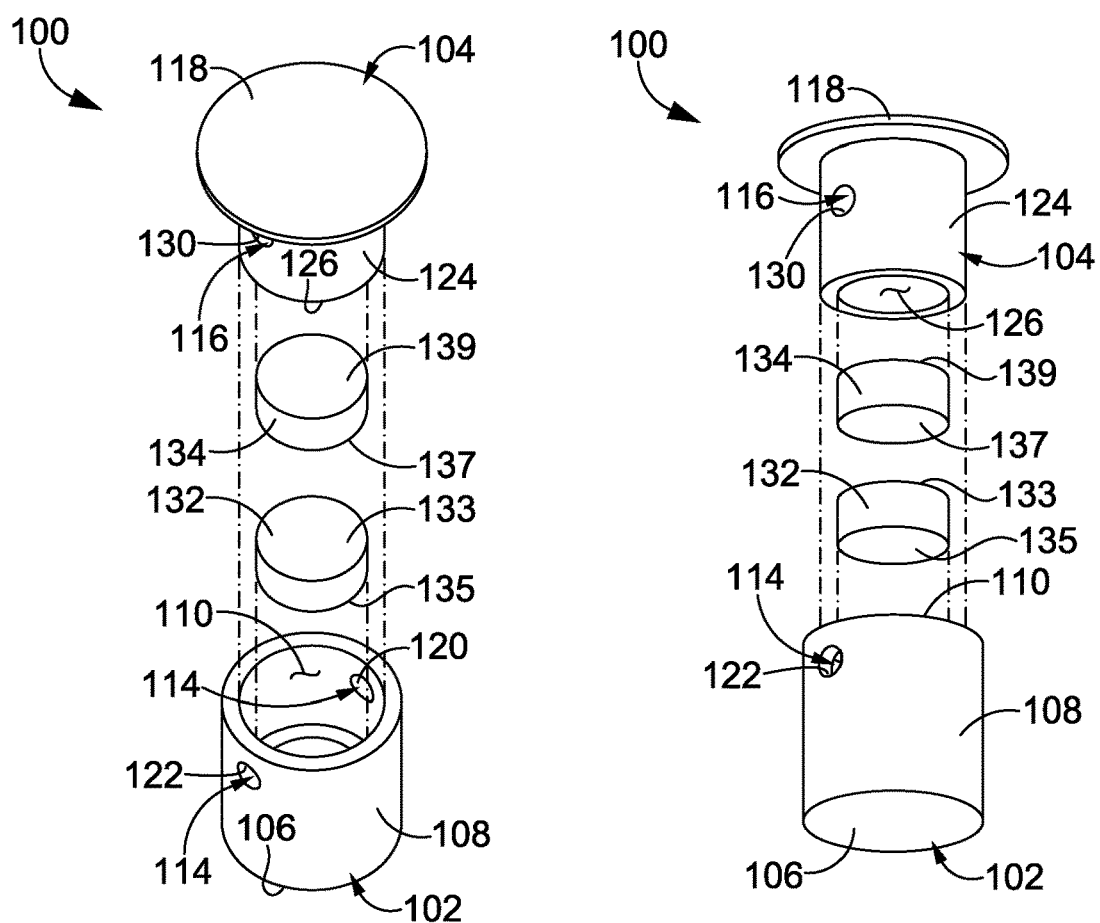
FIG. 2
FIG. 3

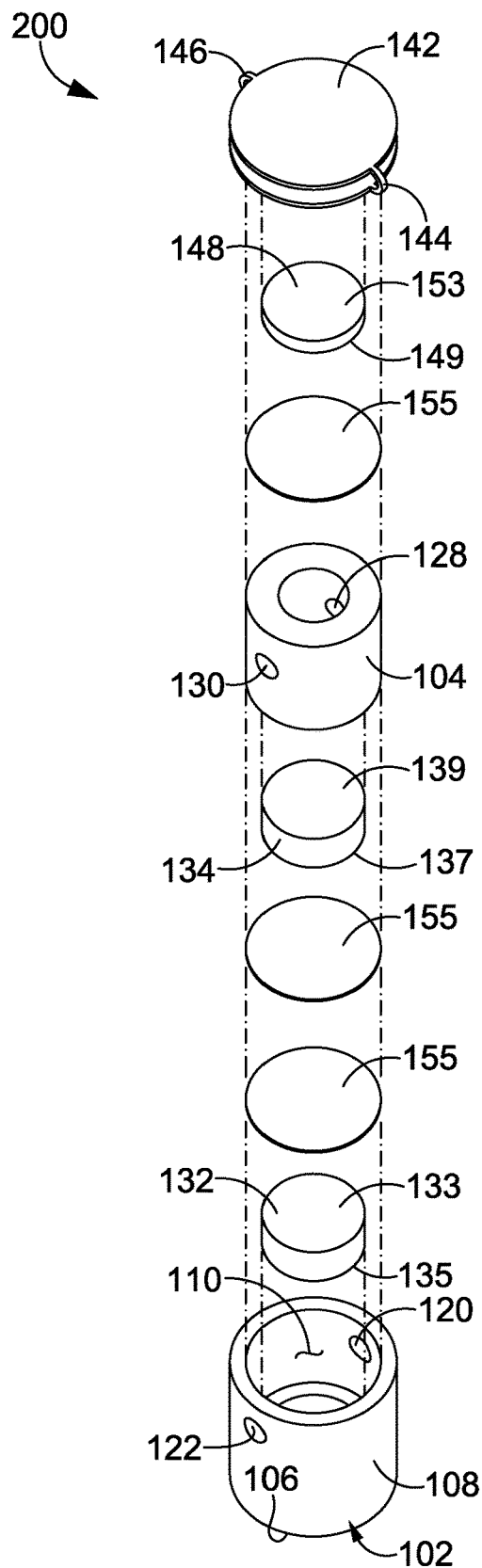
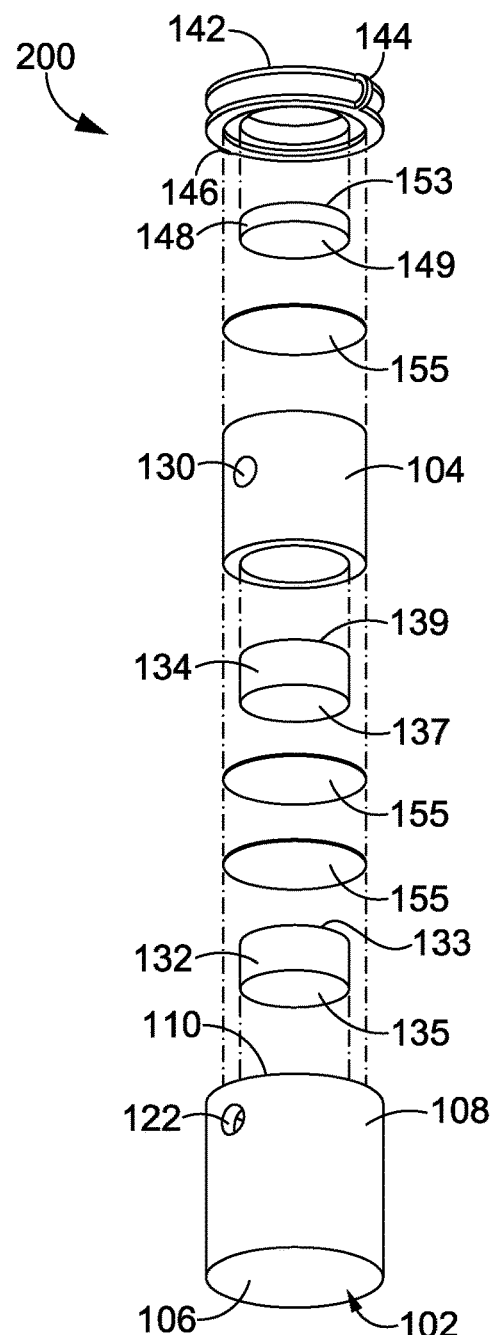
FIG. 8
FIG. 9

CORD LOCK

CROSS-REFERENCE TO RELATED APPLICATIONS AND PRIORITY CLAIM

This U.S. Non-Provisional Patent Application is a continuation that claims priority to U.S. Non-Provisional patent application Ser. No. 15/239,284, filed Aug. 17, 2016, now U.S. Pat. No. 10,226,104, titled "Cord Lock," which claims priority to U.S. Provisional Patent Application No. 62/207,153, filed Aug. 19, 2015, titled "CORD LOCK." These referenced applications are each incorporated herein by reference in the entirety.

TECHNICAL FIELD

The present disclosure relates to cord locks.

BACKGROUND

Drawcords or just "cords" (also sometimes referred to as laces, cables, drawstrings, and the like) are commonly integrated into various types of articles (e.g., bags, garments, etc.) to allow modification of a feature of the article, such as a size, dimension, or shape. Cord locks provide a mechanism to adjust, and set, a length of cord, and may utilize a biasing element to provide a force on the cord.

BRIEF DESCRIPTION OF THE DRAWINGS

Aspects of the present disclosure are described in detail herein with reference to the figures, which are exemplary and non-limiting in nature and which are incorporated herein by reference, wherein:

FIG. 1 depicts a perspective view of a cord lock, in accordance with an aspect hereof;

FIG. 2 depicts a first exploded view of the cord lock of FIG. 1, in accordance with an aspect hereof;

FIG. 3 depicts a second exploded view of the cord lock of FIG. 1, in accordance with an aspect hereof;

FIG. 8 depicts a first exploded view of the cord lock of FIG. 7, in accordance with an aspect hereof;

FIG. 9 depicts a second exploded view of the cord lock of FIG. 7, in accordance with an aspect hereof;

DETAILED DESCRIPTION

Figure 4:
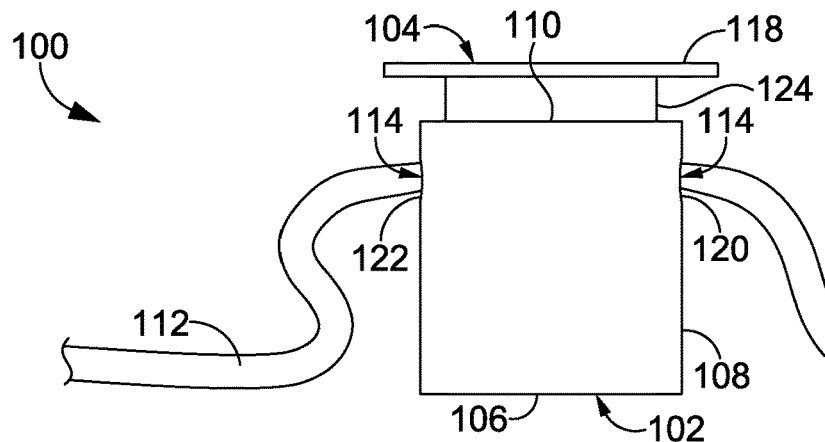
FIG. 4 depicts a side elevation view of the cord lock of FIG. 1, in accordance with an aspect hereof.

The subject matter of various aspects of the present disclosure is described with specificity herein to meet statutory requirements. However, the description itself is not intended to limit the scope of the invention. Rather, the claimed subject matter may be embodied or carried out in other ways, to include different elements, configurations, and/or steps, including those similar to the ones described in this document, and in conjunction with other present or future technologies.

In brief, and at a high level, this disclosure describes, among other things, a cord lock having one or more components that releasably clamp onto a cord for slidably adjusting a length of the cord extending through the cord lock. Additionally, a magnetic force (e.g., a repelling force) may be generated from two magnetic elements incorporated into the cord lock to restrict movement of the cord through the cord lock. An exemplary cord lock may include a housing and a plunger having respective first and second through-channels that are alignable when the housing and the plunger are coupled together in a movable fashion. The through-channels may serve as a passage through which a cord can extend and be engaged by the cord lock. The cord lock may further include a first magnet that has a first pole with a first polarity (e.g., North pole) and a second pole with a second polarity (e.g., South pole), and a second magnet that has a third pole with the first polarity and a fourth pole with the second polarity. In this respect, the magnets may be oriented such that two poles having the same polarity are oriented towards each other to produce a repelling force that biases the first and second magnets apart, thereby also biasing the housing and the plunger apart to actively dealign the through-channels and increase resistance on a cord positioned in the cord lock. In this sense, the magnets may react in a manner consistent with traditional magnets, which allow for an attracting force between a first magnet and a second magnet when opposite poles are aligned and a repelling force between the first magnet and the second magnet when common poles are aligned.

In exemplary aspects, the housing and the plunger may be movably (e.g., slidably) coupled to each other such that the plunger may be depressed by an external force (e.g., a user-applied pressing force) to move the first and second magnets together against the repelling force, moving the first and second through-channels towards alignment. As the first and second through-channels converge towards alignment, a cord passing through the channels may be more easily moveable than when the first and second through-channels are further from alignment. This may allow easier adjustment of a length of cord extending through the cord lock. In aspects, the cord lock may be combined with an article. The cord lock may also be springless, or alternatively, may include one or more springs.

In a first aspect, a cord lock is provided. The cord lock comprises a housing having a base and one or more sidewalls extending from the base to at least partially define a plunger-receiving space. The one or more sidewalls include a first through-channel, and the housing includes a first magnet that has a first pole with a first polarity and a second pole with a second polarity. The magnet is positioned in the plunger-receiving space. The cord lock further comprises a plunger including a second through-channel that is alignable with the first through-channel when the plunger is positioned in the plunger-receiving space. The plunger has a second magnet that has a third pole with the first polarity and a fourth pole with the second polarity. The first polarity of the first pole and the first polarity of the third pole are a same polarity, and the first pole and the third pole are oriented towards each other, such that the first polarity of the first pole and the first polarity of the third pole bias the second magnet away from the first magnet to dealign the first through-channel and the second through-channel.

In a second aspect, an article is provided. The article comprises an article layer having a first surface and a second surface, with a first connection component affixed to the first surface of the article layer. The article further comprises a cord lock comprising a housing having a base and one or more sidewalls extending from the base to at least partially define a plunger-receiving space, the one or more sidewalls having a first through-channel. The housing includes a first magnet that has a first pole with a first polarity and a second pole with a second polarity. The first magnet is positioned in the plunger-receiving space. The cord lock further comprises a second connection component affixed to the base of the housing, and a plunger having a second through-channel that is alignable with the first through-channel when the plunger is positioned in the plunger-receiving space. The plunger has a second magnet that has a third pole with the first polarity and a fourth pole with the second polarity. The first polarity of the first pole and the first polarity of the third pole are a same polarity, and the first pole and the third pole are oriented towards each other, such that the first polarity of the first pole and the first polarity of the third pole bias the second magnet away from the first magnet to dealign the first through-channel and the second through-channel. The first and second connection components are coupled to secure the cord lock to the article layer, and a cord is positioned in the first and second through-channels.

In a third aspect, a cord lock is provided. The cord lock comprises a housing having a base and one or more sidewalls extending from the base to at least partially define a plunger-receiving space, the one or more sidewalls including a first through-channel. The housing includes a first magnet that has a first pole with a first polarity and a second pole with a second polarity and that is positioned in the plunger-receiving space. An article mounting mechanism is secured to the base. The cord lock further comprises a plunger including a second through-channel that is alignable with the first through-channel when the plunger is positioned in the plunger-receiving space. The plunger has a second magnet that has a third pole with the first polarity and a fourth pole with the second polarity. The first polarity of the first pole and the first polarity of the third pole are a same polarity. The first pole and the third pole are oriented towards each other, such that the first polarity of the first pole and the first polarity of the third pole bias the second magnet away from the first magnet to dealign the first through-channel and the second through-channel. The cord lock further comprises a cord-retention cap.

As discussed in various aspects, a cord lock may be incorporated into an article (e.g., apparel, footwear, bag, equipment, and the like) having an article layer with first and second surfaces. The cord lock may attach to the article and/or the first and second surfaces using various mechanisms. For example, the cord lock may include integrated structures (e.g., flanges, tabs, etc.) that attach to and/or through an article layer. Additionally, or alternatively, a first connection component may be affixed to the first surface of the article layer, in which case a cord lock may be positioned on the second surface and attach to the first connection component (e.g., such as through an aperture or slit in the article layer). Adhesive, male-female couplings, welding, and other fasteners may be used as well.

In additional aspects, the cord lock may include a cord-retention device positioned on or coupled to a cord threaded through the cord lock. For example, the cord-retention device may be constructed into, or attached to, the cord to impede the cord from being inadvertently unthreaded from the cord lock. In addition, the cord-retention device may removeably or fixedly attach onto an article or to the cord lock itself to help gather and/or organize cord that extends through and beyond the cord lock. In one aspect, the cord-retention device includes a magnet having a pole with a polarity that can be oriented towards a pole of another magnet in the cord lock with a different polarity, so that the cord-retention device can be magnetically affixed to the cord lock.

A "cord" as used herein includes, but is not limited to, a string, strand, fiber, cord, rope, yarn, thread, strap, ribbon, lace, band, and the like. A cord may be comprised of multiple filaments or a monofilament. A cord may be wound, braided, knit, woven, spun, cut, and the like. In an exemplary aspect, a cord is an element used in connection with apparel, footwear, equipment, and the like to secure, tighten, constrict, wrap, or otherwise exert a tensioning force about an element (e.g., a wearer or an article). Specifically, it is contemplated herein that a cord, cord lock, and/or article or article layer incorporating a cord lock may be used in connection with a shirt, jacket, pant, pair of shorts, ¾ or capris, an article of footwear or outerwear (e.g., gloves, mittens, hat, rain gear, winter gear, etc.), swim wear, bags, outdoor gear (e.g., a tent, a sleeping bag, etc.), and the like. The above-listed use considerations are intended to be exemplary and non-limiting in nature, and other uses are contemplated.

A magnetic element (e.g., a magnet) is an object having a magnetic field that may be described in terms of magnetic lines of force that originate from the North pole and end at the South pole of the magnetic element. When two magnets having like-type poles are presented to each other (e.g., North-to-North or South-to-South) and placed in relative proximity to one another, an interaction of each of the magnetic fields can repulse the two magnets from one another. As a distance decreases between the similar poles of the axially aligned magnets, the repelling force increases. The repulsive force generated by two like-type poles of axially aligned magnets may serve as a force-generating substitute for a spring-like mechanism, in exemplary aspects. The use of magnets instead of traditional springs, or in addition to traditional springs, may provide an ability to adjust resistive force, provide a different change in force over a distance, provide different form factors, and other potential structural configuration differences, based on the magnetic repulsion from the magnets as opposed to a mechanical-element-generated repulsion. In addition, the use of magnets in combination with, or in place of, springs may address possible issues associated with a reduction in spring elasticity, which may occur over time and/or with repeated use of the springs.

Having described some aspects, reference is now made to FIG. 1, which depicts a top perspective view of a cord lock 100 including a housing 102 and a plunger 104, in accordance with an aspect hereof. In FIG. 1, the housing 102 includes a base 106 and one or more sidewalls 108 extending from the base 106 that at least partially enclose a plunger-receiving space 110. The plunger 104 is positioned in the plunger-receiving space 110, and may be movable (e.g., slidable) relative to the housing 102. In aspects, the base 106 may be wider (e.g., have a greater surface area in a plane of a major surface (e.g., a bottom surface) of the base 106) than the one or more sidewalls 108 (e.g., an area of the one or more sidewalls 108 in a parallel plane to the major surface of the base 106) or may be the same size.

Although depicted as cylindrical, the housing 102 and/or the sidewalls 108 of the cord lock 100 may take any shape or configuration (e.g., circular, square, triangular, rectangular, hexagonal, trapezoidal, various prisms, etc.), and the sidewall(s) 108 may be one continuous wall or multiple independently defined walls (e.g., defined by edges or angular changes). In exemplary aspects, the housing 102 and the sidewalls 108 may be configured to allow for moveable engagement with the plunger 104, such as a slideable engagement. As such, it is contemplated that the components of the cord lock 100 may have a number of configurations, shapes, and sizes while achieving the aspects provided herein.

Figure 5:
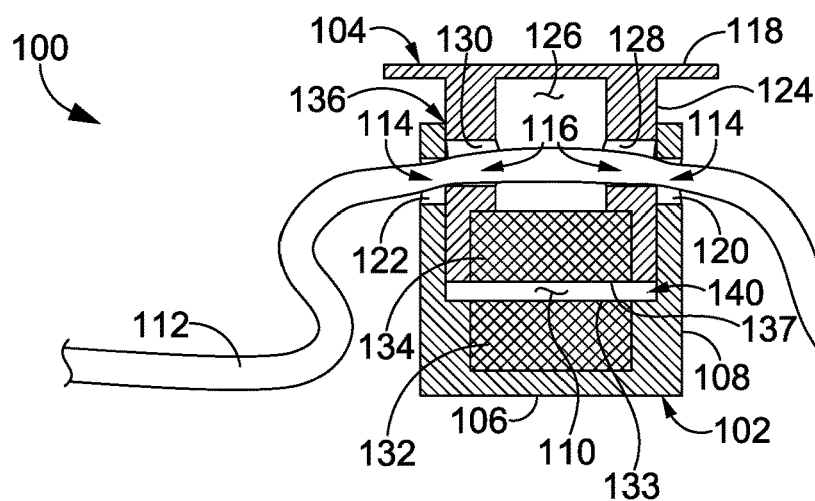
FIG. 5 depicts a cross-section view of the cord lock of FIG. 4 with the cord lock in a resting state, in accordance with an aspect hereof.

As shown in FIG. 1, a cord 112 is positioned in a first through-channel 114 of the housing 102 and in a second through-channel 116 of the plunger 104 (the second-through channel 116 is obscured in FIG. 1; see FIGS. 2-3 and 5 for greater detail). While a multi-portion cord 112 is depicted in FIG. 1, in exemplary aspects, it is contemplated that a single cord or a different number of cord portions may extend through one or more portions of the cord lock 100. The cord 112 passes through the housing 102 and the plunger 104, respectively, entirely through from one side to the other via the first and second through-channels 114, 116. The plunger 104 further includes a cap 118 that is integrated with the plunger 104, in the exemplary configuration of the cord lock 100 shown in FIG. 1. As will be described in other portions of this disclosure, the housing 102 and the plunger 104 include components that releasably clamp onto the cord 112 to allow a length of the cord 112 pulled through the cord lock 100 to be adjusted and maintained.

Referring to FIGS. 2-3, first and second exploded views of the cord lock 100 of FIG. 1 are shown, in accordance with an aspect hereof. In FIG. 2, the housing 102 is shown with the first through-channel 114 formed at least from a first through-hole 120 and a second though-hole 122 extending through the one or more sidewalls 108 of the housing 102. An interior surface of the one or more sidewalls 108 of the housing 102 forms the plunger-receiving space 110 that is configured to receive at least a portion of the plunger 104. The plunger 104 includes the cap 118 and one or more plunger sidewalls 124 extending from the cap 118 that form a magnet-receiving space 126, in the illustrated exemplary configuration. The second through-channel 116 is partially formed from a third through-hole 128 (obscured in FIGS. 2-3; see FIG. 5) and a fourth through-hole 130 extending though the one or more plunger sidewalls 124. In aspects, the first and second through-channels 114, 116 may have their respective holes 120, 122 and 128, 130 offset.

When the cord lock 100 is assembled, a first magnet 132 is secured in the plunger-receiving space 110 such that it does not block or prevent a cord from extending through the first through-channel 114. A second magnet 134 can be received and/or positioned in the magnet-receiving space 126 (or alternatively, in other aspects, in the plunger-receiving space 110) such that it does not block or prevent a cord from extending through the second through-channel 116. When the plunger 104 is inserted in the plunger-receiving space 110, the first and second through-channels 114, 116 are alignable in a manner that allows for the selected cord (or cords) to slidably extend through the cord lock 100.

Regarding the first and second magnets 132, 134 and the biasing force(s) generated therefrom, the first magnet 132 has a first pole 133 with a first polarity (e.g., North) and a second pole 135 with a second polarity (e.g., South), and the second magnet 134 has a third pole 137 with the first polarity and a fourth pole 139 with the second polarity. The first polarity and the second polarity are opposite magnetic polarities (e.g., the first polarity is North and the second polarity is South or, in the alternative, the first polarity is South and the second polarity is North). In this respect, in the configuration shown in FIGS. 2-3, when the cord lock 100 is assembled, the first magnet 132 and the second magnet 134 may be positioned such that the first and third poles 133, 137 having the same polarity are oriented generally towards each other, facing each other. As such, a magnetic repelling force between the first and third poles 133, 137 having the same polarity pushes, moves, and/or biases the first and second magnets 132, 134 away from each other, thereby also actively dealigning the first and second through-channels 114, 116 which may increase frictional resistance on a cord positioned in the first and second through-channels 114, 116, restricting movement thereof.

Referring to FIG. 4, a side elevation view of the cord lock 100 of FIG. 1 is shown, in accordance with an aspect hereof. In FIG. 4, the cord 112 is shown positioned in the first and second through-channels 114, 116 of the cord lock 100, and the plunger 104 is inserted into the plunger-receiving space 110 such that it is slidably coupled to the housing 102.

Figure 6:
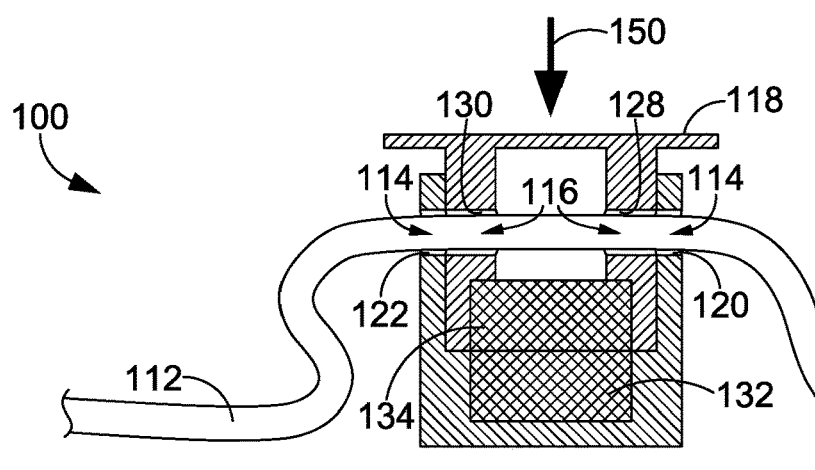
FIG. 6 depicts a cross-section view of the cord lock of FIG. 4 with the cord lock in a depressed state, in accordance with an aspect hereof.

Referring to FIGS. 5-6, cross-section views of the cord lock 100 of FIG. 4 are depicted, in accordance with an aspect hereof. In FIG. 5, the cord lock 100 is depicted in a resting state (e.g., a cord locking state—a state that restricts movement of the cord 112 through the cord lock 100), and in FIG. 6, the cord lock 100 is shown in a depressed state (e.g., a cord adjusting state—a state that provides less restriction of movement of the cord 112 through the cord lock 100 relative to the cord locking state) as a result of a force 150 (e.g., a force applied by a user/wearer) being applied to the plunger 104. In the exemplary aspect shown in FIG. 5, the first magnet 132 is positioned at the bottom of the plunger-receiving space 110. The first magnet 132 may be secured (e.g., adhered and/or physically confined) relative to the base 106 and/or the one or more sidewalls 108.

As discussed, the one or more sidewalls 108 of the cord lock 100 provide the first through-channel 114, which is formed at least from the first through-hole 120 and the second through-hole 122, which are on generally opposite sides of the one or more sidewalls 108, and which extend through the one or more sidewalls 108. The second through-channel 116 is formed at least from the third through-hole 128 and the fourth through-hole 130, which are on generally opposite sides of the one or more plunger sidewalls 124, and which extend through the one or more plunger sidewalls 124. An opening 136 at an opposite end of the housing 102 as the base 106 provides access to the plunger-receiving space 110, which receives the plunger 104. The one or more plunger sidewalls 124 form the magnet-receiving space 126 in which the second magnet 134 is positioned. The second magnet 134 may be secured within the magnet-receiving space 126, such as by adhesive, physical coupling, and/or physical confinement. The second magnet 134 is also positioned such that it does not cover or block a cord from freely passing through the second through-channel 116.

As shown in FIGS. 5-6, a cord 112 extends through the first and second through-channels 114, 116. In FIG. 5, the cord lock 100 is shown in a resting state, with the first and second magnets 132, 134 separated by a gap 140 that is formed from the first and second magnets 132, 134 being repelled away from each other by the same polarities of the first and third poles 133, 137. The biasing from the first and second magnets 132, 134 actively dealigns the first and second through-channels 114, 116.

In FIG. 6, when the plunger 104 is depressed by the force 150 that opposes the repelling force generated by the first and second magnets 132, 134, the plunger 104 moves the first and second magnets 132, 134 together, reducing the gap 140, and moving the first and second through-channels 114, 116 towards alignment. In this regard, when a cord 112 is positioned in the first and second through-channels 114, 116, and the plunger 104 is depressed with the force 150, the progressive alignment of the first and second through-channels 114, 116 may reduce restriction on the movement of the cord 112 through the cord lock 100 at least in part by reducing frictional resistance on the cord 112. Additionally, it should be noted that although the housing 102 and the plunger 104 are depicted as separately formed structures, in other aspects, the housing 102 and the plunger 104 may be integrally formed and move relative to one another, such as by a living hinge or other flexibly movable connection member. In other words, the housing 102 and plunger 104 may be integrally formed or physically distinct.

In further aspects, a cord-retention device may be used with the cord lock 100. The cord-retention device may be constructed into, and/or attached to, the cord 112 to impede the cord 112 from being inadvertently unthreaded from the cord lock 100. For example, the cord-retention device may be a loop or knot formed in the cord 112, or may be a bead or tab that is threaded onto and/or around the cord 112 and that is sized and/or configured to impede passage through the first and second through-channels 114, 116. In addition, the cord-retention device may attach to an article onto which the cord lock 100 is affixed, or may attach to the cord lock 100 itself to help gather or organize excess cord that has been pulled through the cord lock 100.

Figure 7:
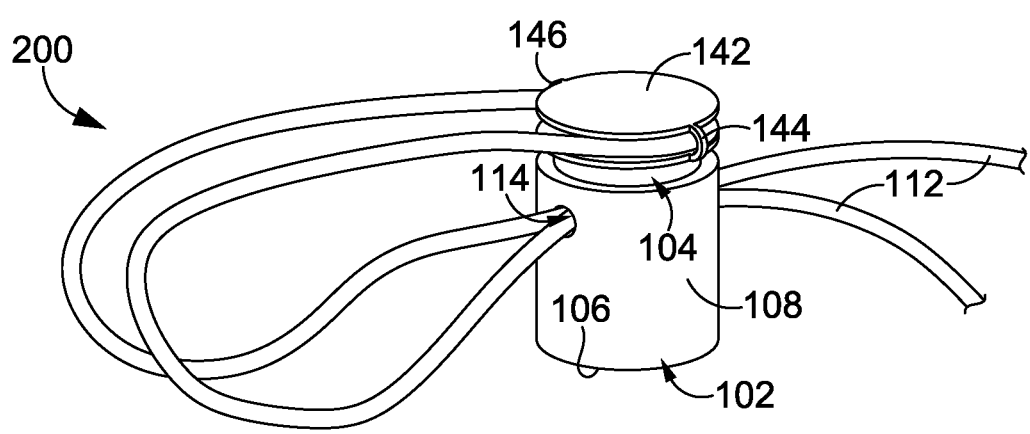
FIG. 7 depicts a top perspective view of a cord lock having a cord-retention cap, in accordance with an aspect hereof.

Referring to FIG. 7, a top perspective view of a cord lock 200 having the housing 102, the plunger 104, and a cord-retention cap 142 is shown, in accordance with an aspect hereof. In FIG. 7, the cord-retention cap 142 includes first and second cord-retention channels 144, 146 for receiving looped portions of the cord 112. The cord-retention cap 142 is selectively positionable on the plunger 104, and in aspects, may be shaped to mate and/or secure to the plunger 104 and/or to the housing 102. In one aspect, the cord 112 may be fed through the first and second cord-retention channels 144, 146 of the cord-retention cap 142 so that the looped end of the cord 112 is secured to the cord lock 200. Alternative configurations are contemplated herein.

Referring to FIGS. 8-9, first and second exploded views of the cord lock 200 of FIG. 7 are shown, in accordance with aspects hereof. In FIGS. 8-9, the cord-retention cap 142 includes a third magnet 148 having a fifth pole 149 having the first polarity and a sixth pole 153 having the second polarity. In this regard, the fourth pole 139 of the second magnet 134 and the fifth pole 149 of the third magnet 148 are opposite magnetic polarities and oriented so that they are generally facing towards each other, such that the opposite polarities of the respective fourth and fifth poles 139, 149 bias (e.g., magnetically attract) the second and third magnets 134, 148 towards each other, allowing the cord-retention cap 142 to magnetically couple to the plunger 104. The cord-retention cap 142 may be shaped or configured to seat (e.g., physically engage to prevent movement, such as lateral movement based on the physical interaction that is maintained by the magnetic attraction) on the plunger 104. Additionally, the cord lock 200 is shown with optional covers 155, which can be positioned between various parts of the assembly, including between the first and second magnets 132, 134 and between the third magnet 148 and the plunger 104, among other locations. In FIGS. 8-9, the first magnet 132 is configured to be positioned in the bottom of the plunger-receiving space 110, the second magnet 134 is configured to be positioned in the magnet-receiving space 126, and the third magnet 148 is configured to be affixed to the bottom of the cord-retention cap 142. Alternative configurations, attachments, and positions of the magnets 132, 134, 148 are possible and contemplated.

Stated in different terms regarding the potential configuration of the magnets 132, 134, 148, the relationship may be expressed in relation to the North-South polarity of each magnet and the linear ordering of those poles. For example, it is contemplated that the magnets 132, 134, 148 have a relative orientation of North-South for the first magnet 132, South-North for the second magnet 134, and South-North for the third magnet 148, to accomplish a repelling force between the first and second magnets 132, 134, while achieving an attraction between the second and third magnets 134, 148. An alternative configuration contemplated for the magnets 132, 134, 148 is a relative orientation of South-North for the first magnet 132, North-South for the second magnet 134, and North-South for the third magnet 148, to achieve the same result. Two magnets having a (North-South) (North-South) orientation attract each other. Two magnets having a (North-South) (South-North) orientation repel each other.

Figure 10:
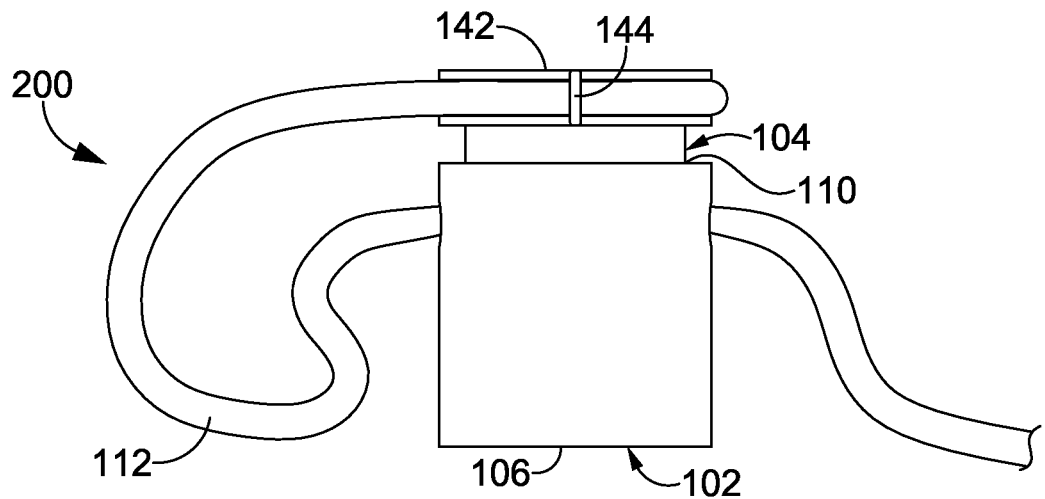
FIG. 10 depicts a side elevation view of the cord lock of FIG. 7 with the cord-retention cap seated on the plunger, in accordance with an aspect hereof.
Figure 11:
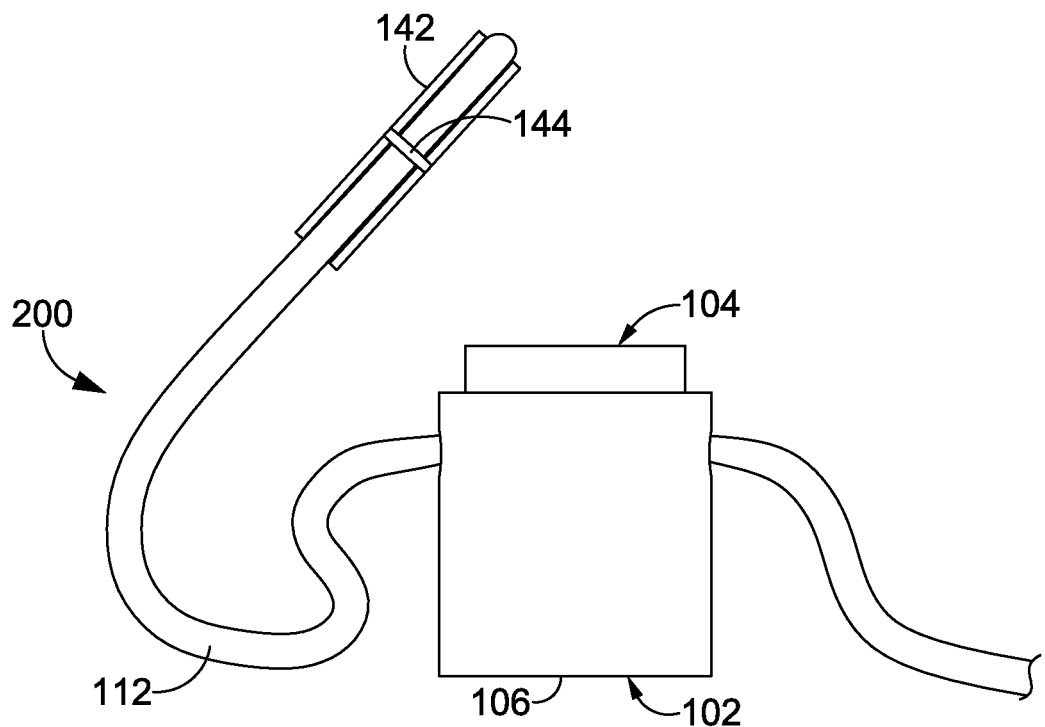
FIG. 11 depicts a side elevation view of the cord lock of FIG. 7 with the cord-retention cap unseated from the plunger, in accordance with an aspect hereof.

Referring to FIGS. 10-11, a side elevation view of the cord lock 200 of FIG. 7 with the cord-retention cap 142 in-place and removed, respectively, is shown, in accordance with aspects hereof. In FIG. 10, the plunger 104 is received in the plunger-receiving space 110, and the doubled over cord 112 is inserted through the first and second through-channels 114, 116 of the cord lock 100, and the looped end of the cord 112 is coupled to the first and second cord-retention channels 144, 146 of the cord-retention cap 142. The cord-retention cap 142 is magnetically coupled to the top of the plunger 104, using the attraction of the second and the third magnets 134, 148, as discussed above. As described, the second magnet 134 includes a fourth pole 139 with the second polarity oriented towards the fifth pole 149 of the third magnet 148 which has the first polarity. Because the first and second polarities are opposite magnetic polarities, the second and third magnets 134, 148 are attracted to each other, helping to magnetically seat the cord-retention cap 142 on the plunger 104. FIG. 11 shows the cord-retention cap 142 removed from the top of the plunger 104.

Figure 12:
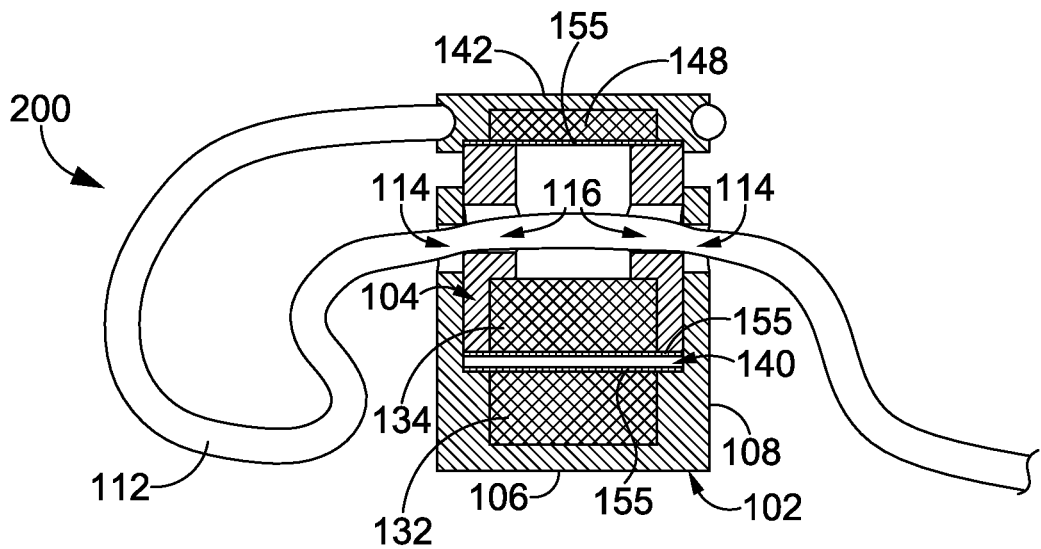
FIG. 12 depicts a cross-section view of the cord lock of FIG. 7 with the cord lock in a resting state, in accordance with an aspect hereof.
Figure 13:
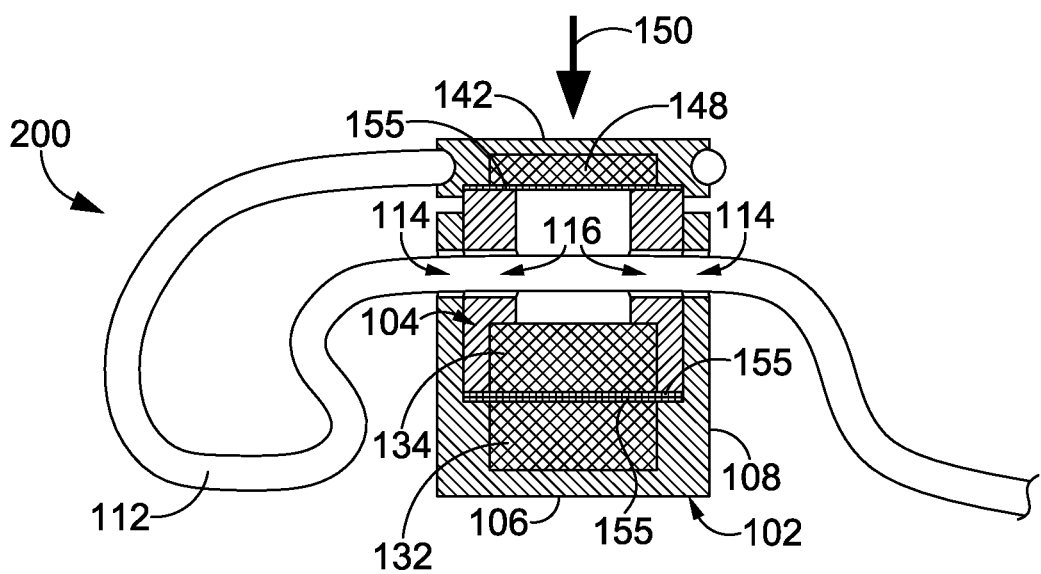
FIG. 13 depicts a side cross-section view of the cord lock of FIG. 7 with the plunger depressed, in accordance with an aspect hereof.

Referring to FIGS. 12-13, side cross-section views of the cord lock 200 of FIG. 7, with the cord lock 200 in a resting state and a depressed state, respectively, are shown, in accordance with aspects hereof. In FIGS. 12-13, the cord lock 200 is shown with the third magnet 148 mounted in the cord-retention cap 142, which is positioned on top of the plunger 104, the third magnet 148 and the second magnet 134 being biased towards each other to magnetically couple the cord-retention cap 142 to the plunger 104. In FIG. 12, there is a gap 140 formed between the first and second magnets 132, 134 due to the biased first and second magnets 132, 134. In FIG. 13, a force 150 is applied to the plunger 104 to move the first and second through-channels 114, 116 towards alignment, reducing the gap 140, and allowing easier slidable adjustment of the cord 112 through the cord lock 200.

Figure 14:
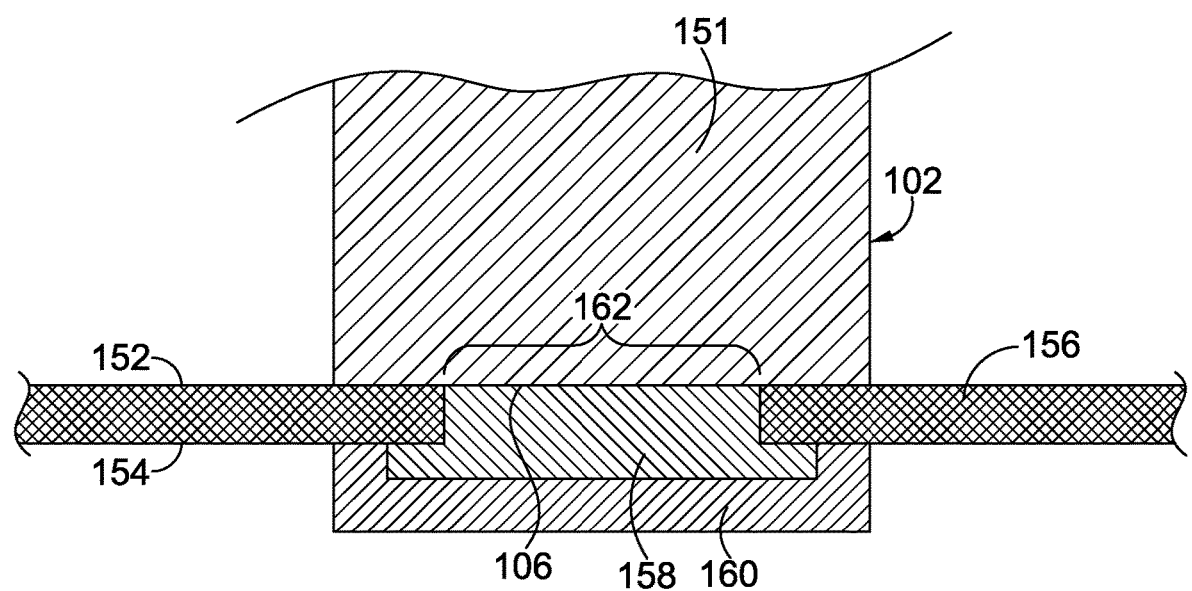
FIG. 14 depicts a cord lock coupled to an article layer, in accordance with an aspect hereof.

As previously indicated, a cord lock may be integrated with an article, such as a garment, bag, footwear, equipment, and the like. Referring to FIG. 14, a cord lock 151 is provided that is coupled to an article layer 156, in accordance with an aspect hereof. The cord lock 151 may be one of the exemplary cord locks 100, 200 described herein, or another variation. The article layer 156 includes a first surface 152 and a second surface 154. A housing 102 of the cord lock 151 shown in FIG. 14 includes a first connection component 158 coupled to the base 106 of the housing 102. The first connection component 158 may be integrally formed with the base 106 of the housing 102 or may be affixed by some other means (e.g., mechanically, adhesively, etc.). A second connection component 160 is coupled to the article layer 156 near an opening 162 in the article layer 156. The second connection component 160 is configured to attach or releasably attach to the first connection component 158 to secure the cord lock 151 to the article layer 156.

Various mounting and connection components may be used to secure the cord lock 151 to the article layer 156, or integrate the cord lock 151 through the article layer 156 for securement. For example, the connection components may employ a quarter-turn fastener, adhesive, compression fittings, welding, stitching, and the like. In addition, the second connection component 160 may also include a magnet, which is attracted to the first magnet 132 in the base of the housing 102, to attach the second connection component 160 to the rest of the cord lock 151, in an exemplary aspect. Any and all types of attachments are contemplated.

Figure 15A:
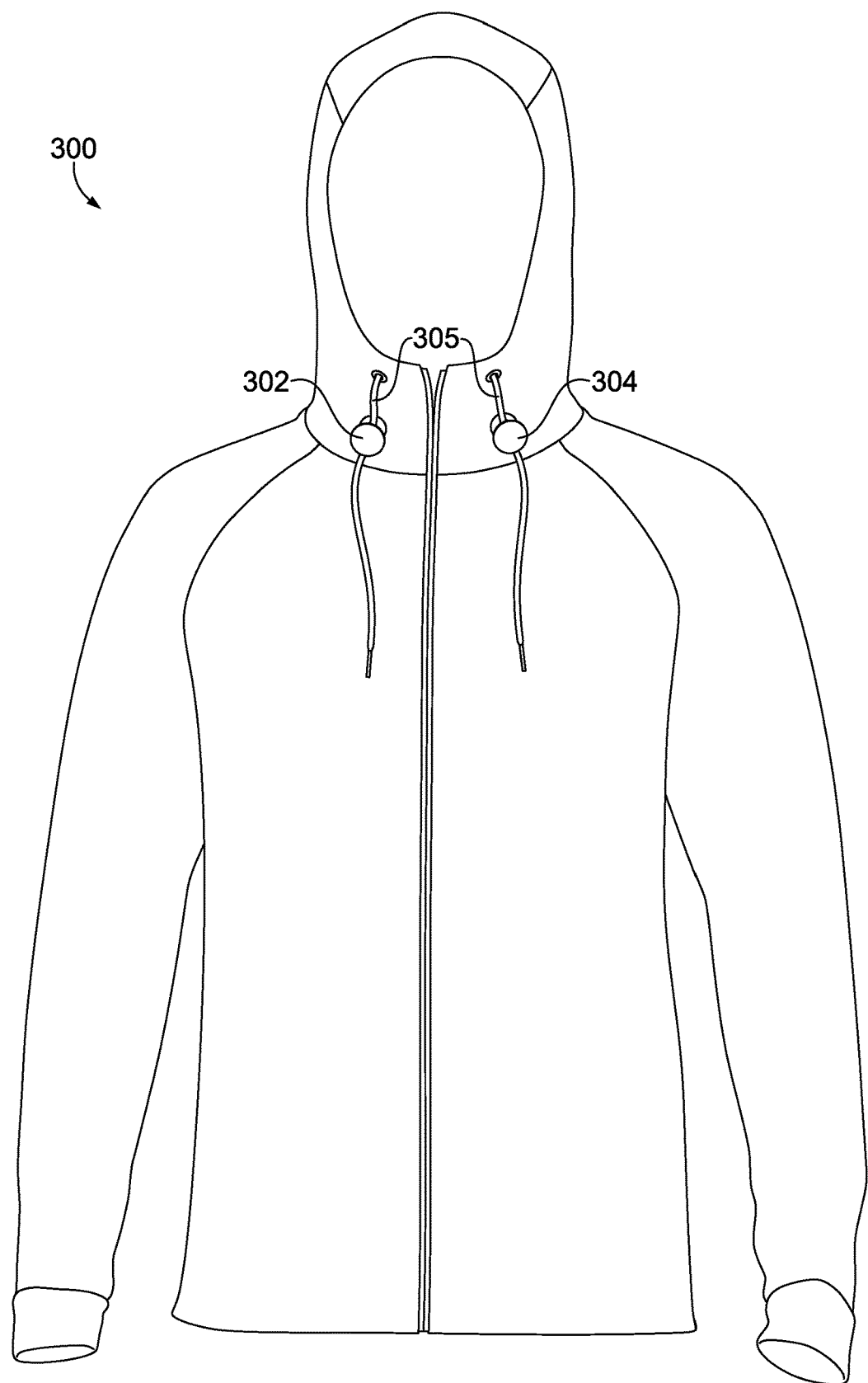
FIGS. 15A-15B depict an example article of apparel having a pair of cord locks incorporated thereon, in accordance with an aspect hereof.
Figure 15B:
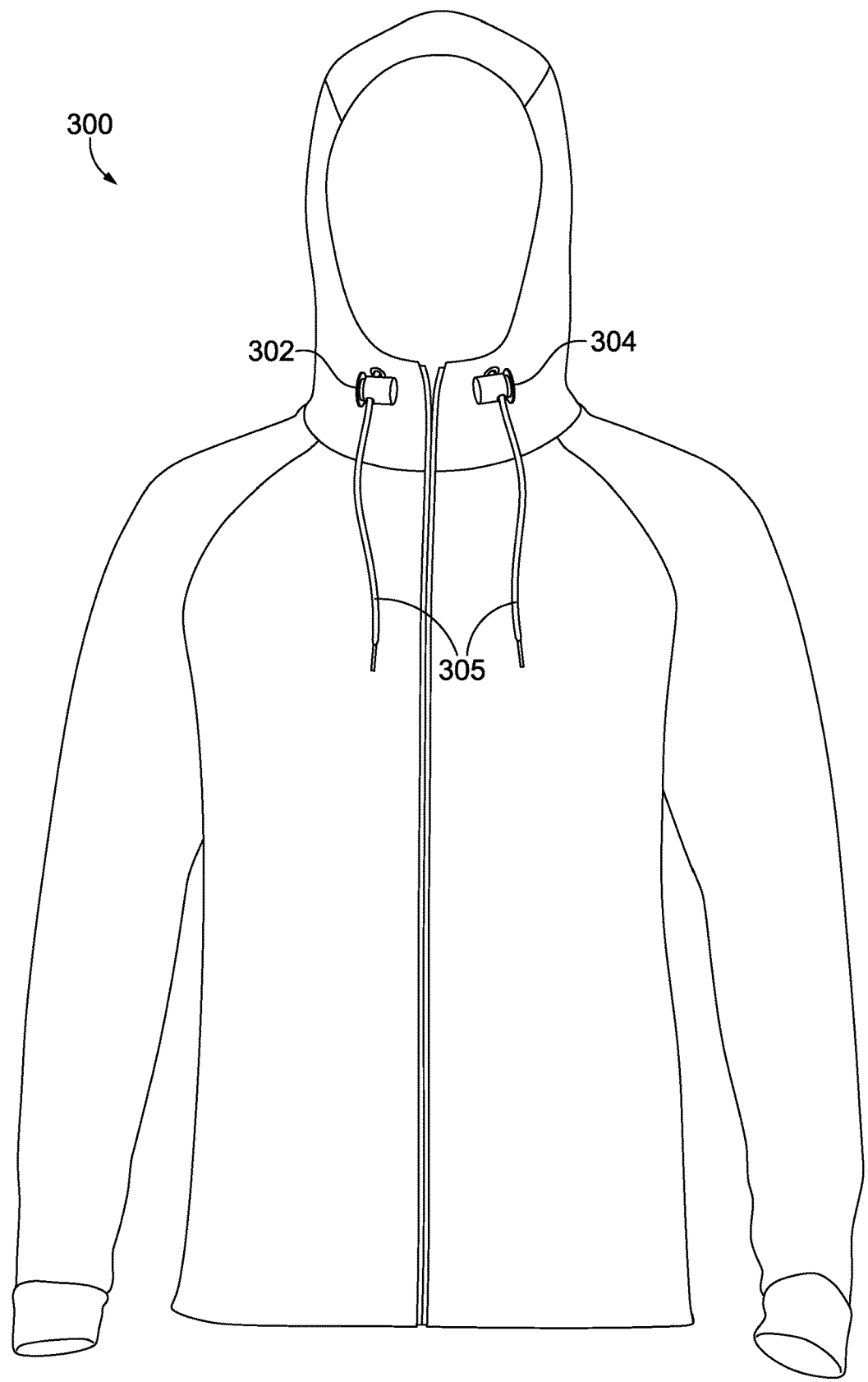
Figure 16A:
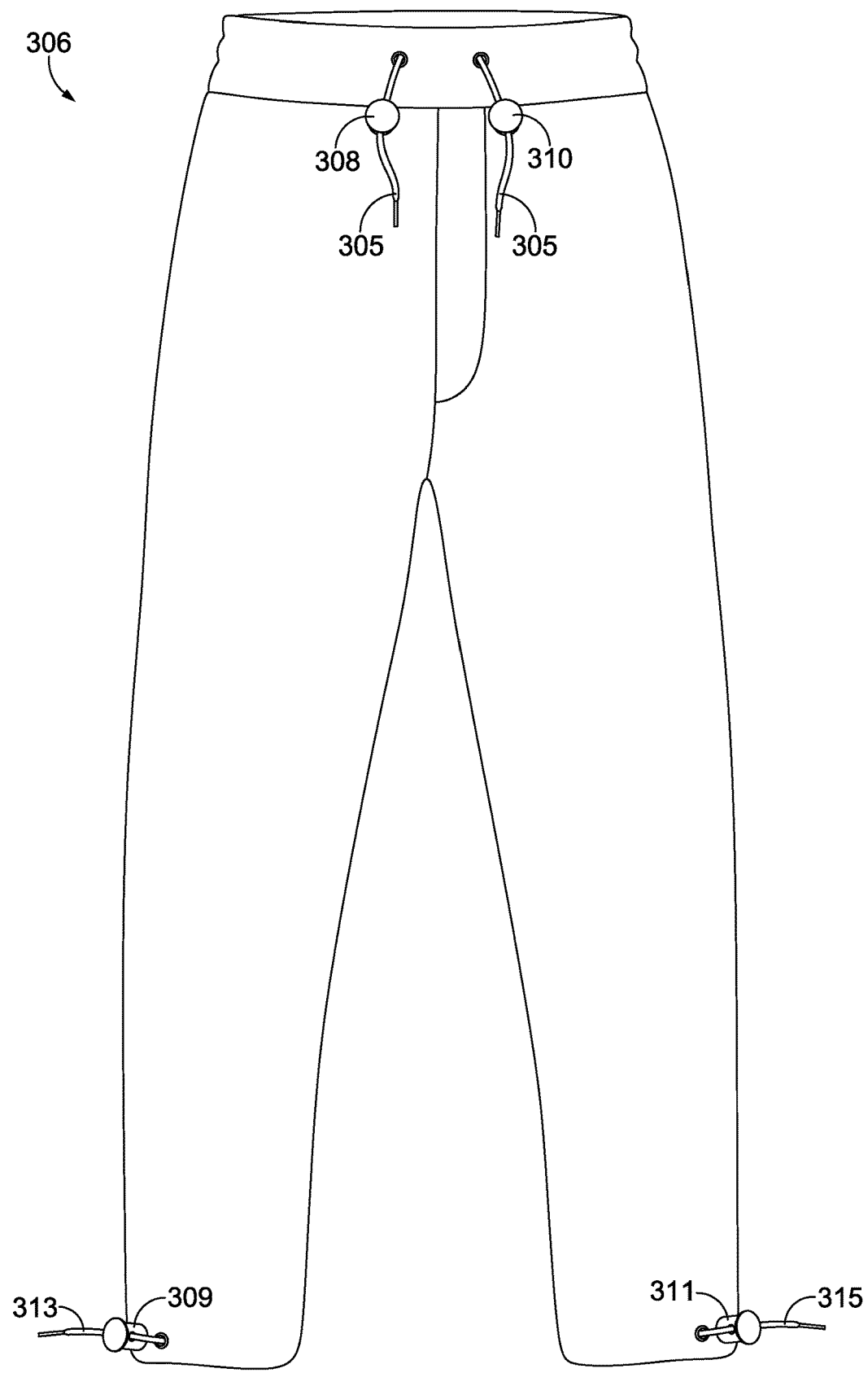
FIGS. 16A-16B depict another example article of apparel having a pair of cord locks incorporated thereon, in accordance with an aspect hereof.
Figure 16B:
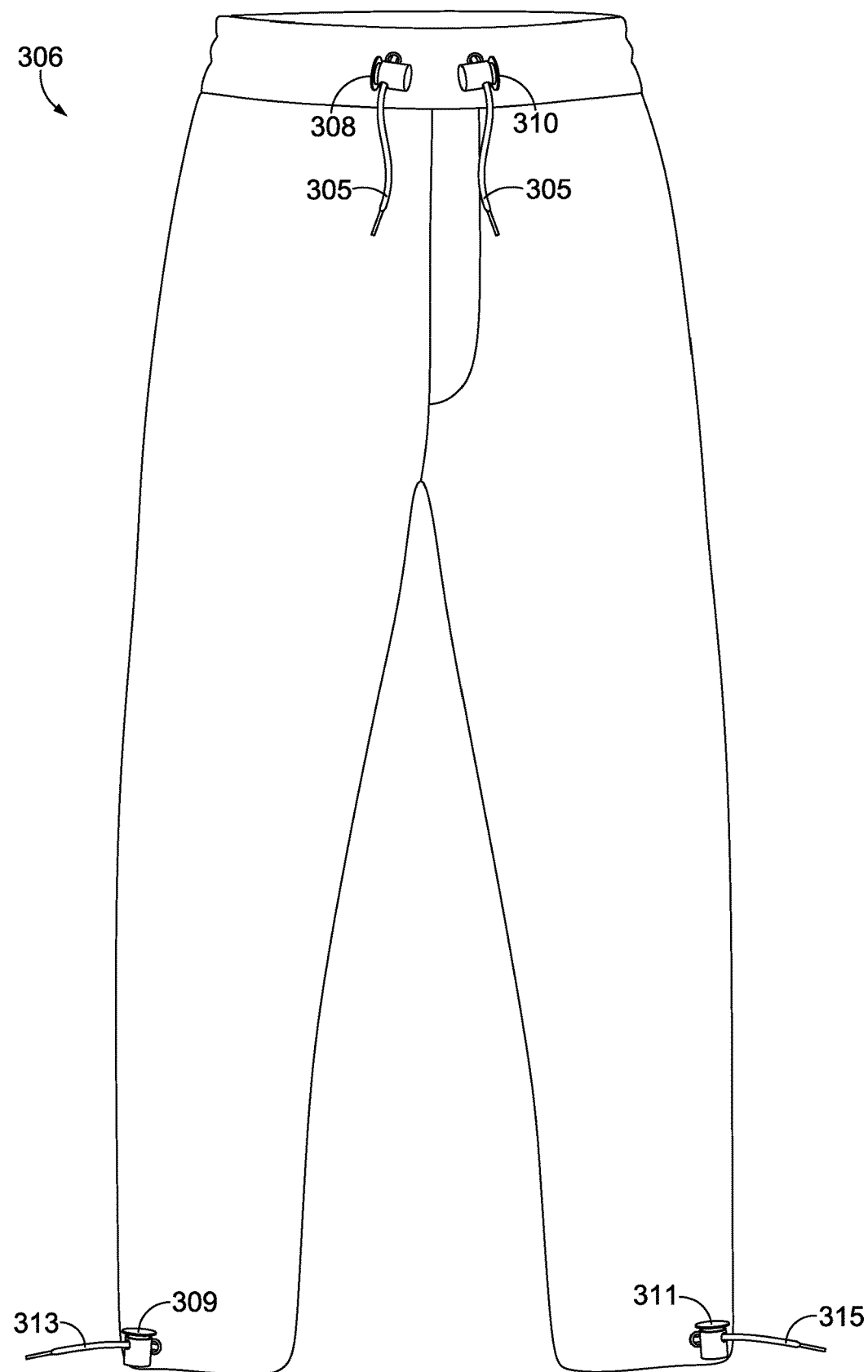
Figure 17A:
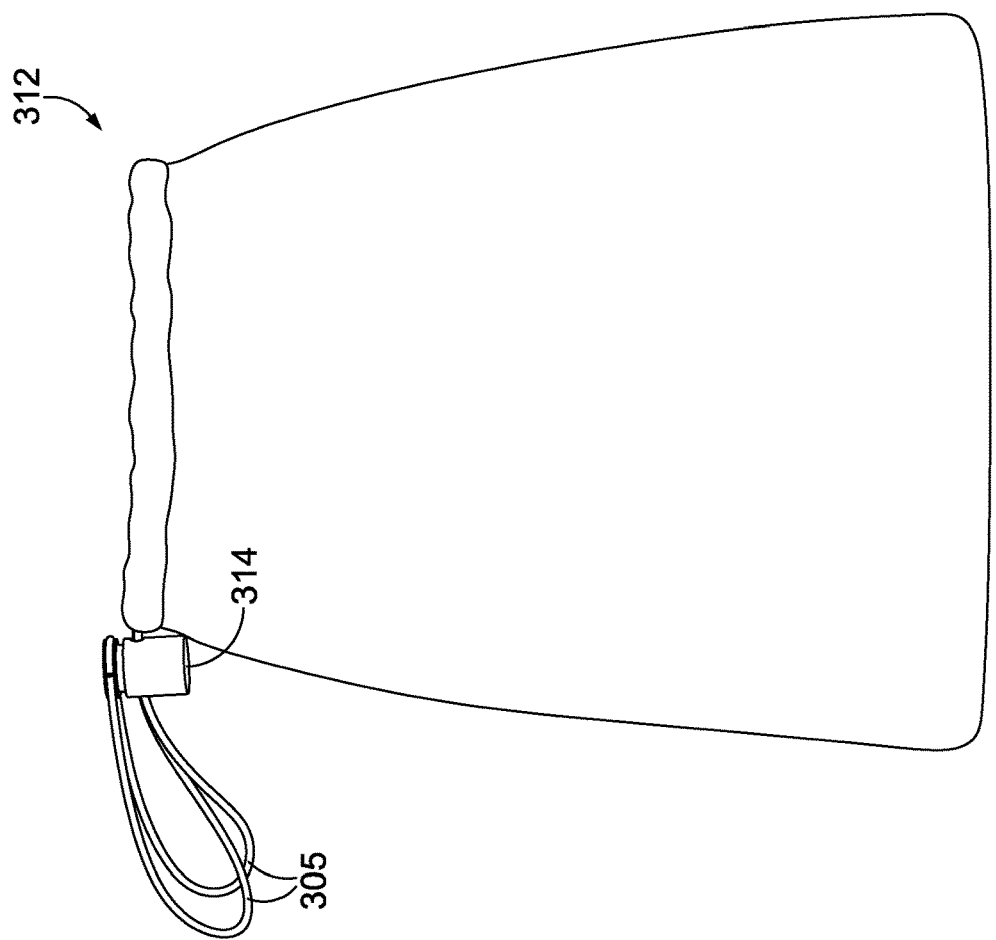
FIGS. 17A-17B depict another example article in the form of a bag having a cord lock incorporated thereon, in accordance with an aspect hereof.
Figure 17B:
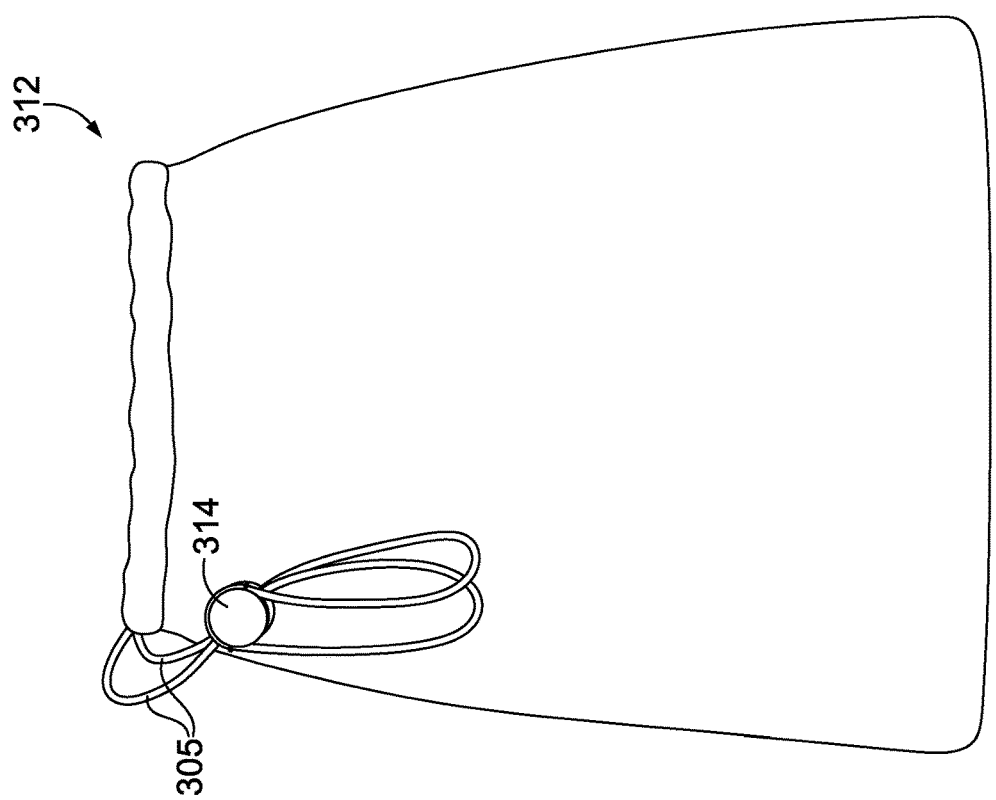
Figure 18A:
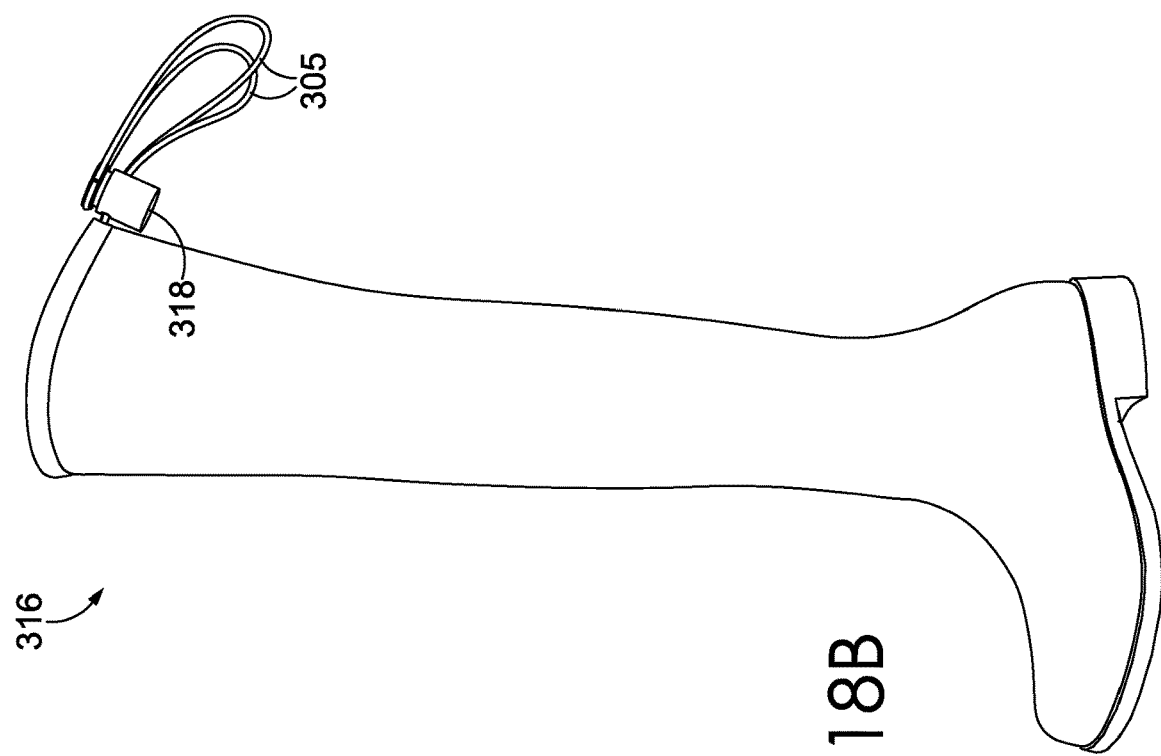
FIGS. 18A-18B depict an example item of footwear having a cord lock incorporated thereon, in accordance with an aspect hereof.
Figure 18B:
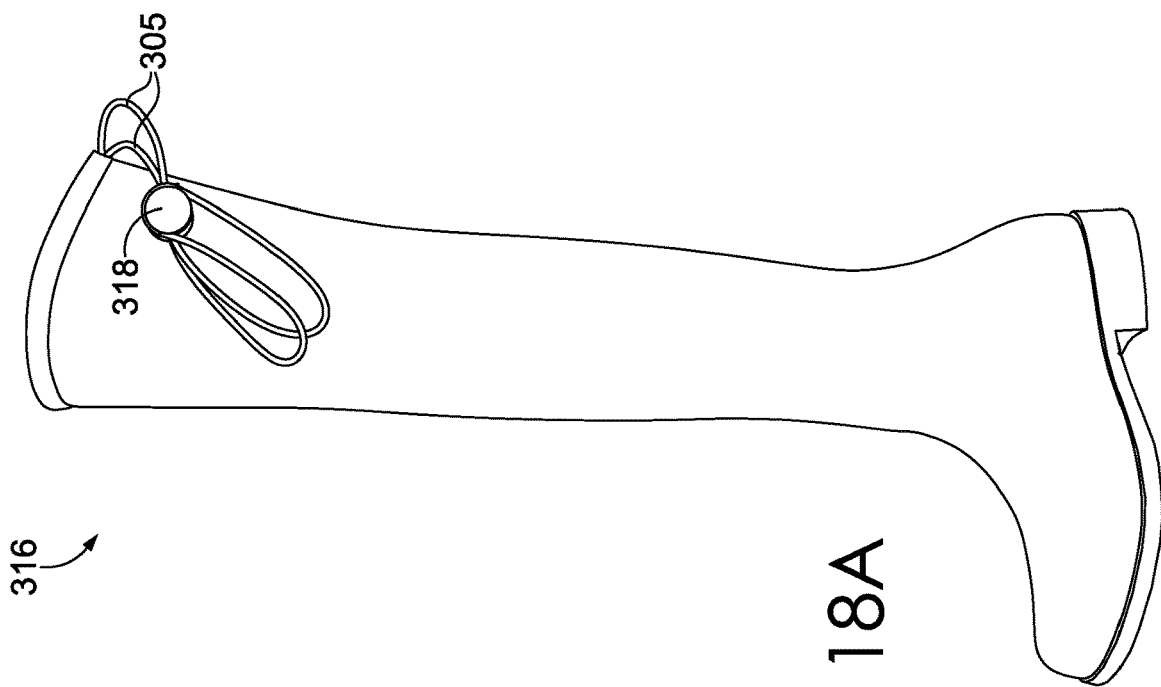

Referring now to FIGS. 15A-15B, 16A-16B, 17A-17B, and 18A-18B, various articles, including articles of apparel, bags, and items of footwear, are shown, each of which includes one or more cord locks, which may be, for example, the illustrative cord locks 100, 200 shown and described herein, in accordance with embodiments hereof. FIGS. 15A-15B show an example article of apparel 300 having a pair of cord locks 302, 304 coupled to one or more cords 305 extending from the article of apparel 300, with FIG. 15A and FIG. 15B showing the cord locks 302, 304 in different slidably adjusted positions. FIGS. 16A-16B show another example article of apparel 306 having a pair of cord locks 308, 310 coupled to one or more cords 305 extending from the article of apparel 306, with FIG. 16A and FIG. 16B showing the cord locks 308, 310 in different slidably adjusted positions. FIGS. 16A-16B further show a pair of cord locks 309, 311 each coupled respectively to one or more cords 313 and 315 extending from the article of apparel 306 so as to provide slidable adjustment along the same. FIGS. 17A-17B show another example article in the form of a bag 312 having a cord lock 314 coupled to one or more cords 305 extending from the bag 312, with FIG. 17A and FIG. 17B showing the cord lock 314 in different slidably adjusted positions. FIGS. 18A-18B depict an example item of footwear 316 having a cord lock 318 coupled to one or more cords 305 extending from the item of footwear 316, with FIG. 18A and FIG. 18B showing the cord lock 318 in different slidably adjusted positions. The article and cord lock configurations shown in FIGS. 15A-15B, 16A-16B, 17A-17B, and 18A-18B are provided as illustrative examples.

The illustrative cord locks 100, 200, and any variations thereof, are depicted as being generally cylindrical. However, as previously indicted, a cord lock, including the housing, plunger, and other components forming the cord lock, may take any number of shapes, including square, triangular, circular, parabolic, trapezoidal, ovular, hexagonal, prismatic, or other symmetrical or asymmetrical shapes. Any through-channels formed through the cord lock, such as, for example, through the housing and/or the plunger which forms the body of the cord lock, may include any number and shape of openings, channels, and/or through-passageways. Additionally, each through-channel, or associated opening on an outside of the cord lock, may be square, rectangular, circular, triangular, trapezoidal, hexagonal, or another symmetrical or asymmetrical shape. There may also be multiple through-channels that may align and dealign, and through which different or looped sections of a cord may be inserted. The cord lock may include additional holes or apertures for looping cord or attaching clips or snaps.

In addition, in other aspects, the cord lock may include additional structures that are integrally formed with, or that are attached to, the cord lock. For instance, the cord lock may include flanges, rims, borders, and/or other features and projections that allow attachment of the cord lock to an article. In aspects, the magnets included in the cord lock may be covered or encased such that the magnets are not visible when the cord lock is assembled, or even when the cord lock is disassembled. For example, the magnets may be sealed within a chamber initially having an open end, on one end or the other, into which one or both magnets are inserted, and after insertion of the magnet(s), the opening may be sealed with a plastic cover, polymer, or resin, to provide a sealed magnet chamber. The cord lock may also be formed at least partially from a see-through or opaque material so that the magnets and/or other parts of the inner portion of the cord lock are visible.

The strength of a magnet used in a cord lock, including as described herein, may be selected from specific ranges to provide attractive forces appropriate for an intended application. For example, when two (or more) magnetic elements are used in combination (e.g., an attractive opposite-polarity orientation of the magnets or a repulsive common-polarity orientation of the magnets), the strength of any one of the individual magnetic elements may be less than if a single magnetic element is used. In some contemplated configurations, the strength of a magnet used in a cord lock to generate a repelling force is 10 Gauss or less. It is also contemplated that the strength of a magnet used in the cord lock to generate a repelling force is 5-10 Gauss. For example, it is contemplated that a repelling force between first and second magnets 132, 134 in the cord lock 100 is 10 Gauss or less.

The strength of a magnet, in exemplary aspects, is maintained at or below 10 Gauss as a result of its potential use on or near a human body. Additionally, it is contemplated that a magnet strength at or below 10 Gauss provides a repelling force effective for locking a cord while still allowing for user manipulation, in an exemplary aspect. A size, shape, and material of the magnets may be changed to achieve a particular magnetic force for a particular application. For example, a strength of magnetic repulsion between the first and second magnets 132, 134 may be greater than the strength of magnetic attraction between the second and third magnets 134, 148, in an exemplary aspect. This differential in strength may result from an amount of force used to prevent/limit cord movement through the cord lock relative to an amount of force used to maintain one component proximate to another component. Therefore, it is contemplated that magnet strength may be adjusted to achieve a functional result.

The use of magnets in articles that are worn on or maintained near a human may be restricted. For example, limitations on magnetic force, location, and size may be taken into consideration when selecting, configuring, implementing, securing, and using a magnet in an article. As such, the configurations, sizing, and shaping of various embodiments contemplated herein are suitable for achieving a cord lock while also considering limitations that may be imposed because of the use of magnets on and/or near a human body.

In alternative aspects of the cord lock, the plunger may form a housing-receiving space into which the housing is inserted and/or slidably coupled, such that one or more plunger sidewalls extending from a base of the plunger at least partially surround the one or more sidewalls of the housing. The magnets may be positioned such that they are fully or partially enclosed within the sidewalls of the housing, such that when the plunger is in a depressed configuration, such as in FIG. 13, the magnets are on a same side of the first and second through-channels. The magnets may also be positioned on opposite sides of the through-channels (e.g., a first magnet more proximate the base 106 and a second magnet more proximate the cord-retention cap 142).

An article may be an item of apparel, a bag, equipment, footwear, or the like. In this respect, an article may be a wearable article, such as a jacket, vest, pullover, pant, short, footwear (e.g., shoe or boot), or other article of apparel. Additionally, the article may be an equipment-based article, such as a track bag, backpack, duffel, side-bag, or waist-bag, for example. The first and second connection components may be buttons, male-female connectors, hook-and-loop connectors, adhesive, stitching, and the like. The through-channels of the cord lock may be sized to receive a single portion (e.g., course) of cord or multiple portions (e.g., multiple discrete courses) of cord.

While specific discussion has been focused on leveraging a repulsive force of magnets to achieve a locking mechanism on a cord, it is contemplated that an attractive force between a magnet and a magnetic element (e.g., ferrous material, another magnet) may additionally or alternatively be used. For example, it is contemplated that a first magnet may be positioned relative to a second magnet such that the attractive force causes a dealignment of through-holes and that an external force (e.g., user push or pull) overcomes the attractive force to move the through-holes towards alignment to allow a cord to slidably move through the cord lock with less restriction. As such, it is contemplated that both a repelling magnetic force and/or an attractive magnetic force may be implemented within a cord lock to achieve an adjustable cord locking mechanism.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features and sub-combinations. This is contemplated by and is within the scope of the claims. Since many possible aspects may be made without departing from the scope hereof, it is to be understood that all matter herein set forth or shown in the accompanying drawings is to be interpreted as illustrative and non-limiting.

What is claimed is:

1. A method of manufacturing a cord lock, the method comprising:
   forming a housing, comprising:
   a base,
   one or more sidewalls extending from the base to at least partially define a plunger-receiving space, the one or more sidewalls including a first through-channel, and
   a first magnet that has a first pole with a first polarity and a second pole with a second polarity, the first magnet positioned in the plunger-receiving space; and
   forming a plunger, comprising:
   a second through-channel that is alignable with the first through-channel when the plunger is positioned in the plunger-receiving space, and
   a second magnet that has a third pole with a first polarity and a fourth pole with a second polarity, wherein the first polarity of the first pole and the first polarity of the third pole are a same polarity, and wherein the first pole and the third pole are oriented towards each other when the plunger is received in the plunger-receiving space so that the first polarity of the first pole and the first polarity of the third pole bias the second magnet away from the first magnet to dealign the first through-channel and the second through-channel.

2. The method of manufacturing of claim 1, wherein the first through-channel comprises a first through-hole and a second through-hole on opposite sides of the one or more sidewalls of the housing, and the second through-channel comprises a first through-hole and a second through-hole on opposite sides of the plunger.

3. The method of manufacturing of claim 1, further comprising movably coupling the housing and the plunger.

4. The method of manufacturing of claim 1, further comprising extending a length of cord through the first through-channel and the second through-channel.

5. The method of manufacturing of claim 1, further comprising:
   forming a cord-retention cap having at least one cord-retention channel, and
   extending a length of cord through the at least one cord-retention channel.

6. The method of manufacturing of claim 5, further comprising removably coupling the cord-retention cap to the plunger.

7. The method of manufacturing of claim 1, wherein at least one of the housing and the plunger is formed from a material that is at least partially opaque.

8. The method of manufacturing of claim 1, wherein the first magnet is positioned within a volume defined by the one or more sidewalls of the housing and the second magnet is positioned at least partially inside the plunger.

9. A method of manufacturing an article, the method comprising:
   coupling a first connection component to an article layer;
   coupling a cord lock to the article layer, the cord lock comprising:
   a housing, comprising:
   a base,
   one or more sidewalls extending from the base to at least partially define a plunger-receiving space, the one or more sidewalls having a first through-channel, a first magnet that has a first pole with a first polarity and a second pole with a second polarity, the first magnet positioned in the plunger-receiving space, and a second connection component; and a plunger, comprising:

a second through-channel that is alignable with the first through-channel when the plunger is positioned in the plunger-receiving space, and a second magnet that has a third pole with a first polarity and a fourth pole with a second polarity, wherein the first polarity of the first pole and the first polarity of the third pole are a same polarity, and wherein the first pole and the third pole are oriented towards each other when the plunger is received in the plunger-receiving space so that the first polarity of the first pole and the first polarity of the third pole bias the second magnet away from the first magnet to dealign the first through-channel and the second through-channel, wherein coupling the cord lock to the article layer comprises coupling the first connection component to the second connection component.

10. The method of manufacturing of claim 9, further comprising extending a length of cord through the first through-channel and the second through-channel.

11. The method of manufacturing of claim 9, further comprising:

forming a cord-retention cap having at least one cord-retention channel, and extending a length of cord through the at least one cord-retention channel, wherein the cord-retention cap is adapted to be removably coupled to the plunger.

12. The method of manufacturing of claim 9, wherein the article is an item of apparel, a bag, or an item of footwear.

13. The method of manufacturing of claim 9, wherein the first connection component and the second connection component are coupled to each other through an opening in the article layer.

14. A cord lock, comprising:

a housing having a first through-channel;

a plunger having a second through-channel that is alignable with the first through-channel, wherein the housing and the plunger are movably coupled to each other and at least partially enclose an interior volume;

a first magnet positioned in the interior volume; and a second magnet positioned in the interior volume, wherein the first magnet and the second magnet are oriented within the interior volume so that a repelling force between the first magnet and the second magnet biases the second magnet away from the first magnet to dealign the first through-channel and the second through-channel.

15. The cord lock of claim 14, wherein the first magnet has a north polarity and a south polarity, wherein the second magnet has a north polarity and a south polarity, and wherein the north polarity of the first magnet and the north polarity of the second magnet are oriented towards each other within the interior volume to generate the repelling force, or, the south polarity of the first magnet and the south polarity of the second magnet are oriented towards each other within the interior volume to generate the repelling force.

16. The cord lock of claim 14, further comprising a cord-retention cap having at least one cord-retention channel for receiving a length of cord extended through the cord lock, wherein the cord-retention cap is adapted to be removably coupled to the plunger.

* * * * *